No. 827,691. PATENTED JULY 31, 1906.
C. M. HEFFRON.
FRUIT SLICER.
APPLICATION FILED DEC. 26, 1901.

4 SHEETS—SHEET 1.

Witnesses
Walter B. Payne
G. Willard Rich

Inventor.
Cassius M. Heffron
by Frederick G. Church
his Attorney

No. 827,691. PATENTED JULY 31, 1906.
C. M. HEFFRON.
FRUIT SLICER.
APPLICATION FILED DEC. 26, 1901.

4 SHEETS—SHEET 2.

Witnesses.
Walter B. Payne
Willard Rich

Inventor.
Cassius M. Heffron
by Frederick S. Church
Attorney

No. 827,691. PATENTED JULY 31, 1906.
C. M. HEFFRON.
FRUIT SLICER.
APPLICATION FILED DEC. 26, 1901.

4 SHEETS—SHEET 3.

Witnesses.
Walter B. Payne.
G. Willard Rich.

Inventor.
Cassius M. Heffron
by Frederick S. Church
his Attorney

No. 827,691. PATENTED JULY 31, 1906.
C. M. HEFFRON.
FRUIT SLICER.
APPLICATION FILED DEC. 26, 1901.

4 SHEETS—SHEET 4.

Witnesses
Walter B. Payne
G. Willard Rich

Inventor
Cassius M. Heffron
by Frederick F. Church
his Attorney

THE NORRIS PETERS CO., WASHINGTON, D. C.

UNITED STATES PATENT OFFICE.

CASSIUS M. HEFFRON, OF ROCHESTER, NEW YORK.

FRUIT-SLICER.

No. 827,691.  Specification of Letters Patent.  Patented July 31, 1906.

Application filed December 26, 1901. Serial No. 87,144.

*To all whom it may concern:*

Be it known that I, CASSIUS M. HEFFRON, of Rochester, in the county of Monroe and State of New York, have invented certain new and useful Improvements in Fruit-Slicers; and I do hereby declare the following to be a full, clear, and exact description of the same, reference being had to the accompanying drawings, forming a part of this specification, and to the reference-numerals marked thereon.

My present invention has for its object to provide a machine for slicing fruit or vegetables and one adapted particularly for slicing fruit, such as apples, the ends of which are usually slightly flattened by the paring and trimming of the fruit previous to the slicing operation, and it embodies such an arrangement of parts that the fruit may be automatically properly positioned and severed into rings.

To these and other ends the invention consists in certain improvements in construction and combinations of parts, all as will be hereinafter fully described, the novel features being pointed out in the claims at the end of this specification.

Figure 1:
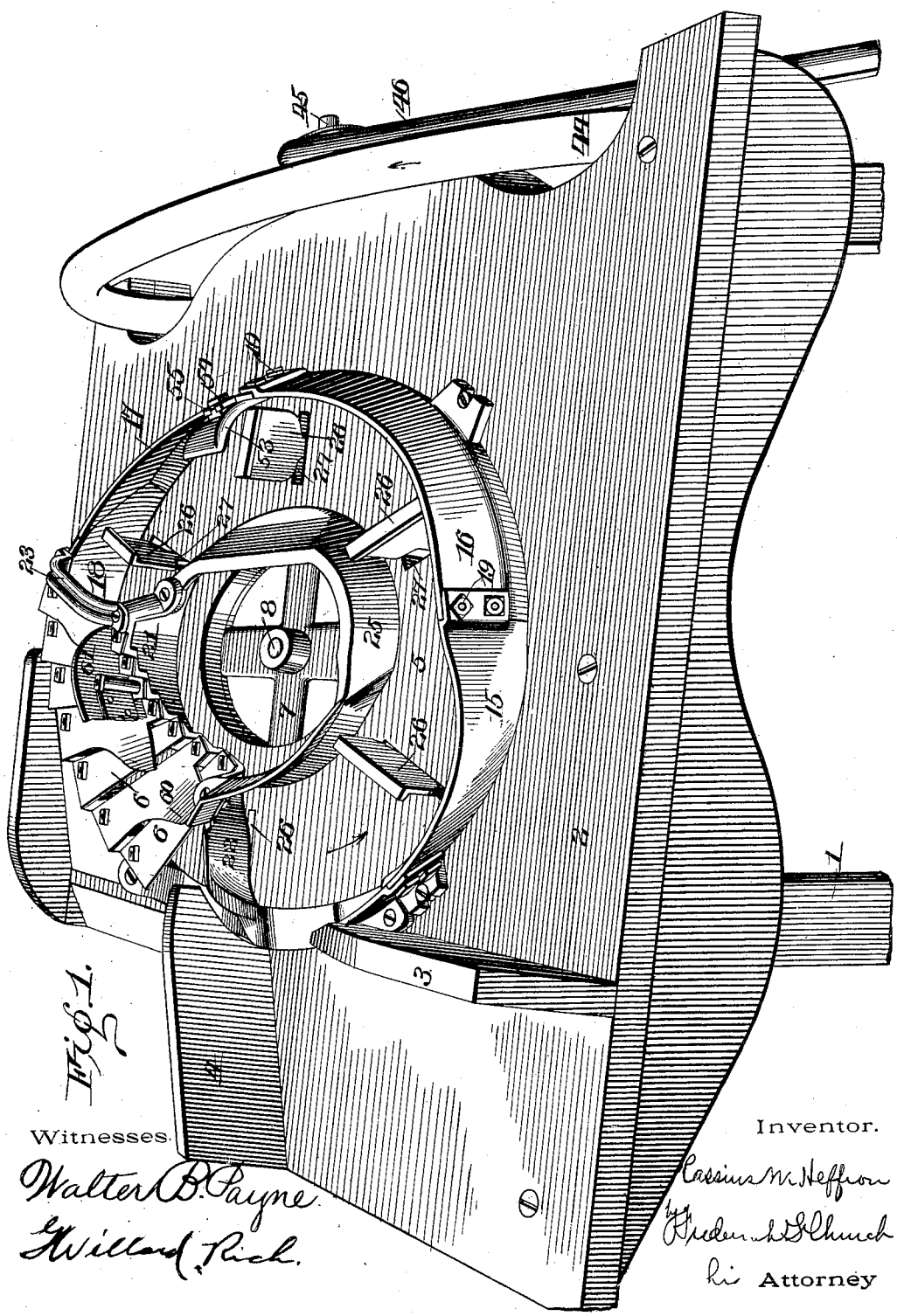
Figure 2:
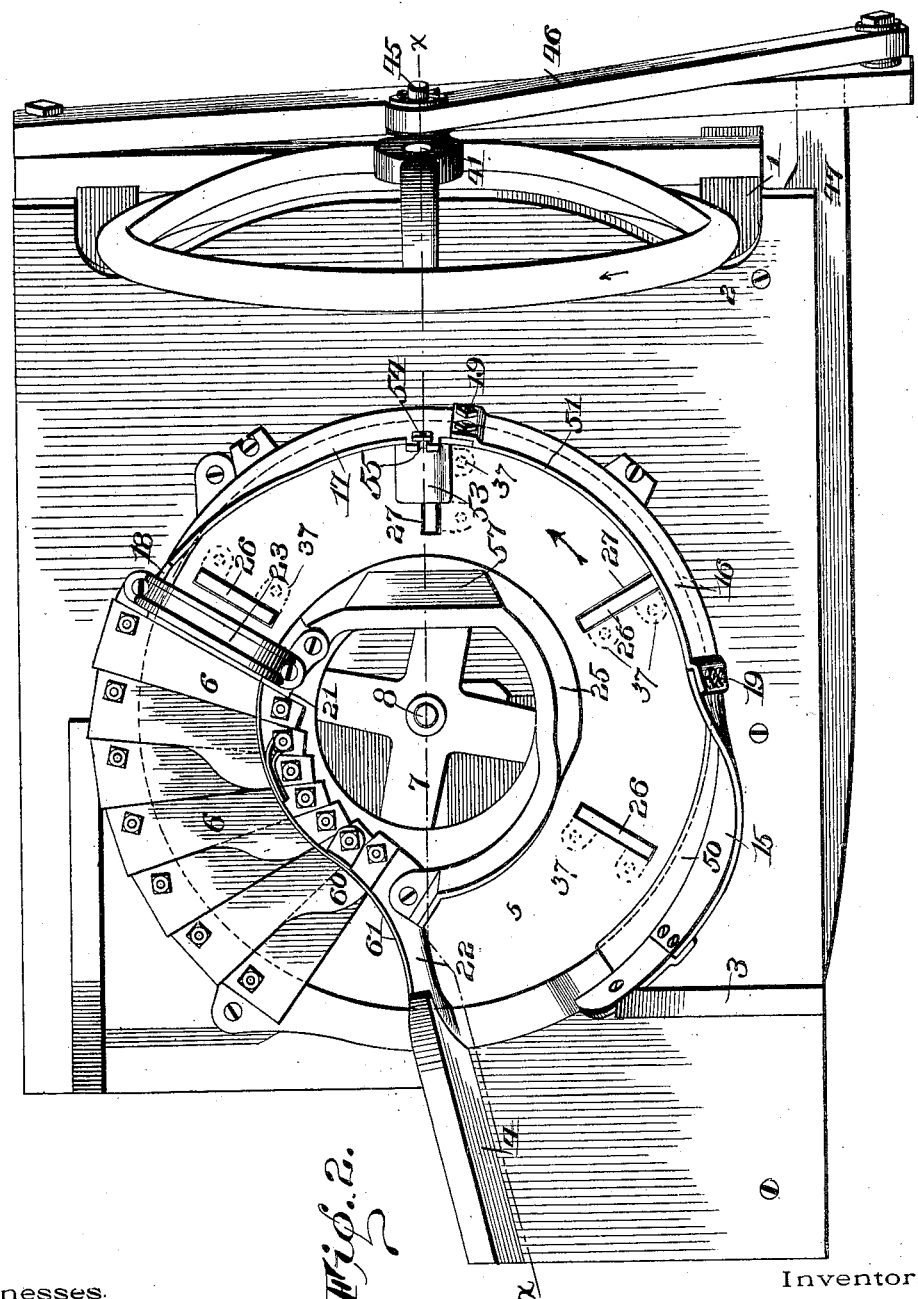
Figure 3:
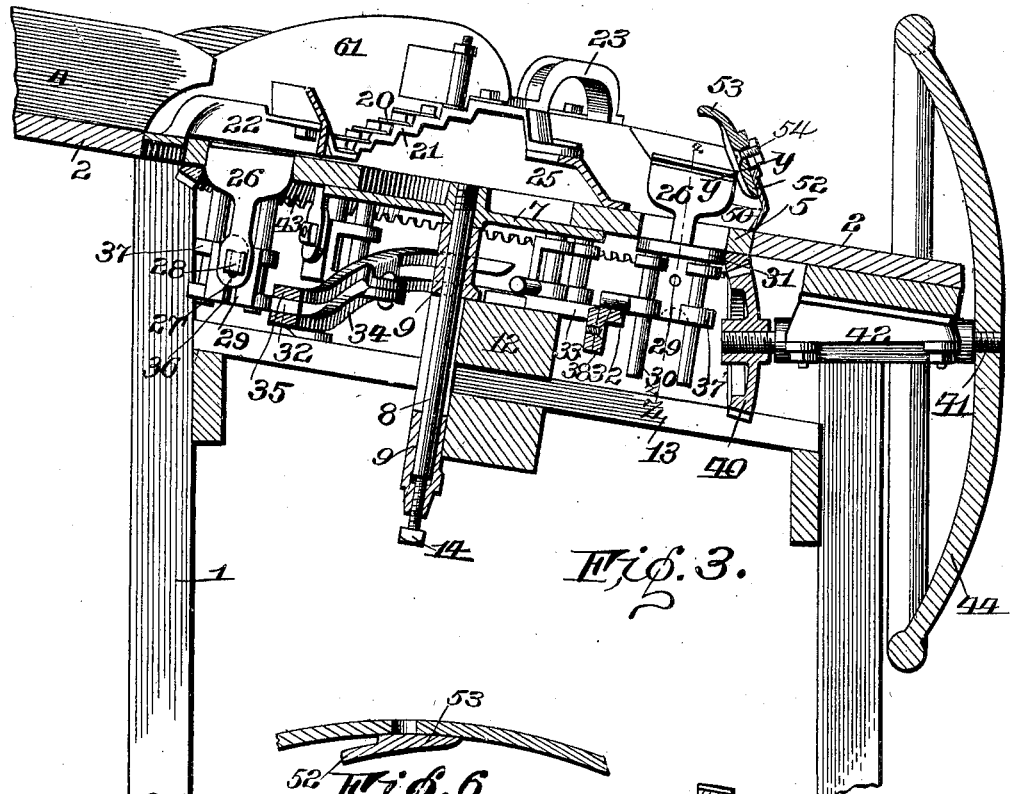
Figure 4:
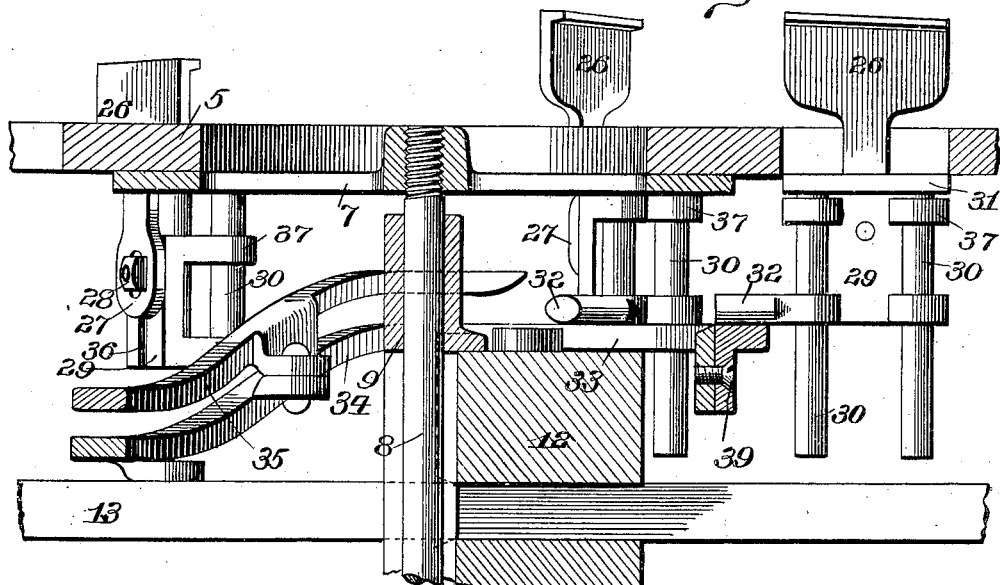
Figure 5:
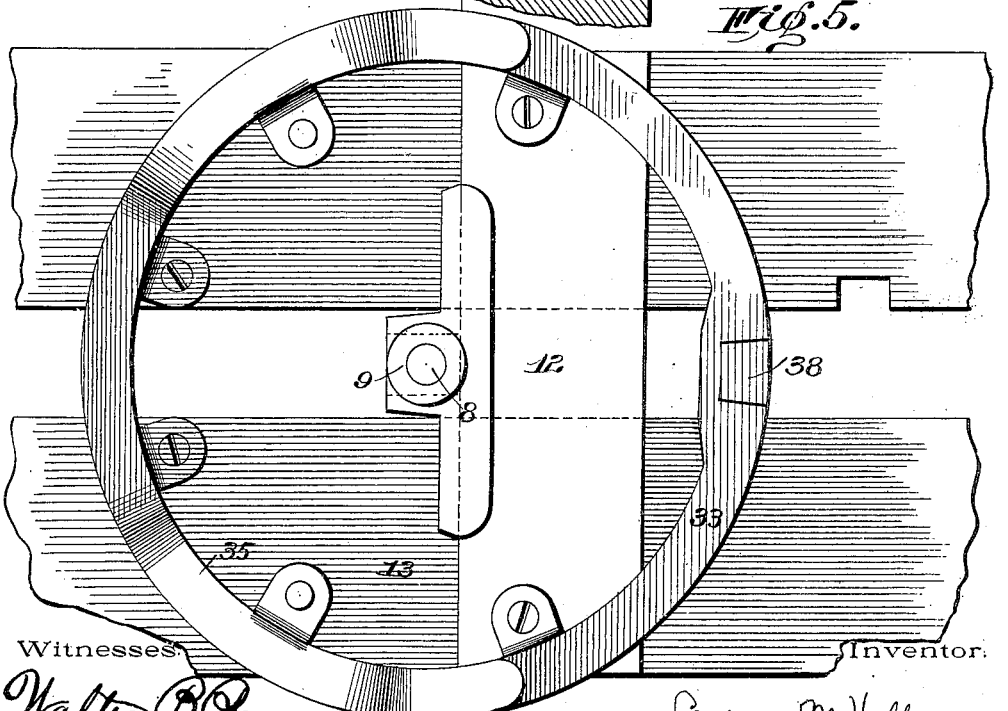

In the drawings, Figure 1 is a perspective view of a slicing-machine constructed in accordance with my invention. Fig. 2 is a top plan view thereof. Fig. 3 is a cross-sectional view on the line *x x* of Fig. 2. Fig. 4 is a similar view of some of the parts enlarged. Fig. 5 is a plan view of the cam-ring. Fig. 6 is a sectional view on the line *y y* of Fig. 3, and Fig. 7 is a sectional view of one of the knives. Fig. 8 is a sectional view on the line *z z* of Fig. 3. Fig. 9 is a perspective view of the finger attached to the outer guard-ring.

Similar reference-numerals in the several figures indicate similar parts.

A slicing-machine constructed in accordance with my invention embodies a support in the form of a table having the legs 1 and the top 2 inclined slightly toward one end and supporting the slicing mechanism. The upper end of the table constitutes a shelf upon which the fruit may be received from any suitable hopper or feeding device and guided by the vertically-extending walls 3 and 4, between which is an opening permitting the fruit to pass onto a movable support or platform 5, by means of which the separate pieces of fruit are brought into contact and forced between a series of knives 6, whereby it is severed into slices, the latter being received in a suitable receptacle arranged at the rear side of the upper end of the table and in rear of the wall 4.

The platform 5 is circular in form and extending in the plane of the table-top and is attached to a wheel or spider 7, mounted on a shaft 8, journaled in bearings 9. The latter are supported upon blocks 12, secured on opposite sides of frame-pieces 13, located beneath the table. This arrangement provides a simple construction whereby the shaft may be supported near its extremities to hold the platform steadily in its inclined position. In the lower bearing I provide an adjusting-screw 14 for moving the shaft to adjust the platform vertically.

Surrounding the platform is a ring or guard substantially circular in form and secured rigidly to the top 2. The ring or guard is warped or twisted throughout a portion of its length, as will be further described, and for convenience in construction it is composed of a series of sections (indicated by 15, 16, 17, and 18) secured together, as shown, by bolts or screws 19. The portion 18 constitutes the knife section or support having upon its upper edge a series of steps to which are secured the outer ends of knife-blades 6, the inner ends of which are supported upon a similar stepped section 21, secured at one end by an arm 22 and at the other by a bridge-piece 23 and forming a portion of a ring 25, supported rigidly above the platform 5 and substantially concentric with the outer guard or ring.

The fruit delivered to the platform is carried thereon and forced between the knives by a series of heads or pushers 26, operating vertically through apertures 27 in the platform and adapted to be retracted as they pass beneath the knives, forcing the fruit between the latter, but without interfering with the movement of the platform. Each of the heads 26 is provided on its lower side with an extension 27', secured by a bolt 28 to a slide 29, vertically movable on guides 30, attached to a base-plate 31, securely mounted on the lower side of the platform.

The heads are held projected above the platform by means of lugs or projections 32 on the slides 29, which rest upon a circular cam-ring 33, supported on the frame-pieces 13 and block 12 and arranged concentric with the shaft 8. The cam-ring extends parallel with the platform 5, excepting a portion thereof beneath the knives 20, which extends downwardly, as at 34, where it is paralleled by a similarly-curving segment 35, beneath which the lugs or projections 32 engage, forming a cam-slot by which the heads are retracted as they approach the knives and are projected again after passing the latter. The heads are separately adjustable upon the slides by means of an elongated aperture, through which the bolts 28 pass, whereby they may be adjusted vertically, so that they will pass as close to the edges of the knives as it is practical to have them operate without engaging the latter, and to assist in securing the heads to the slides they are further provided with a V-shaped rib engaging a corresponding recess 36 in the face of the slide. In order to allow the easy removal of the heads from the platform, the guides 30 are formed as posts or rods, with which engage the apertured extensions 37 on the slides 29, the latter being held thereon and operated by the lugs or projections 32, resting on the cam-ring, and by means of a removable portion 38 in the ring, secured by a bolt or screw 39, as shown in Figs. 4 and 8, I provide a simple arrangement whereby the lugs on the slides may be allowed to pass the cam-rings to facilitate their application or removal.

The platform 5 is rotated toward the knives in the direction indicated by the arrow in Fig. 1 by means of a bevel-pinion 40, mounted on a driving-shaft 41, carried in a bearing 42 and meshing with a ring gear-wheel 43, attached to the lower face of the platform, as shown in Fig. 3. At the outer end of the driving-shaft is secured a flywheel 44, and projecting therefrom is a crank-pin 45, to which is attached one end of a pitman 46, connected at its opposite extremity to a foot-treadle 47.

The fruit to be sliced is previously pared and trimmed, which latter operation leaves it somewhat flattened on its ends, and in order to form ring slices when cored fruit is passed between the knives I provide means for rolling or tumbling the fruit to cause it to assume a position on one of its ends as the platform revolves. This is accomplished by the warped or irregular formation of the outer and inner rings, and which for convenience will be termed "tumbling-rings," and these latter are stationary above the platform and portions thereof overhang it, so that the fruit engaging with one or the other of said rings will be retarded in its movement and caused to roll upon the platform in a direction opposite to that of the movement of the latter. It is impracticable to rotate the platform at a high rate of speed, for the reason that the centrifugal motion imparted to the fruit will cause it to be thrown outwardly and held in contact with the outer ring, when it will be either slid along or rolled so rapidly that it is impossible for it to come to a state of equilibrium upon one of its flattened ends. More satisfactory results are obtained by operating the platform at a moderate speed and inclining it slightly, so that the fruit as it is passed onto the platform is caused to gravitate toward the outer ring and contact therewith while it is being carried forward, and as the fruit is not held forcibly in contact with said ring by any centrifugal action it is free to roll inwardly on the platform. The lower portion of the outer tumbling-ring extends at a slight angle away from the platform at the bottom, as indicated by 50, and its top inclines inwardly, as shown at 51 in Figs. 1 and 3, excepting at its upper end, where the section 15 flares outwardly, as shown. On the section 17 of the outer ring is a finger having its rear edge 52 raised slightly (see Fig. 6) to form a projection and provided with the upper end 53 curving over the platform. This finger is secured by means of the bolt 54, operating in a slot 55, whereby it may be adjusted relative the platform and adapted particularly to direct inwardly or change the direction of movement of any pieces of fruit that may be still rolling in contact with the outer ring, the inner tumbling-ring at this point being flattened or cut away, as indicated by 57, to allow the fruit to move sidewise. The finger being adjustable may be moved relative the platform, as required, by the average size of the largest pieces of the fruit being operated on at any one time. These pieces, if they happen on account of their size or weight to roll along in contact with the outer ring with their core-apertures in a horizontal position, will engage the projecting edge 52 or curved end 53 and be turned toward the center of the platform to bring the core-aperture into a vertical position, when the fruit will rest upon one of its flattened ends.

The cam-rings 33 and 35 are arranged in such a manner that the heads 29 are not raised or projected above the table until after they pass the opening between the walls 3 and 4, so that there is no possibility of the fruit engaging therewith as it is fed promiscuously to the platform. In order to separate the slices as they pass between the knives, I provide upon the rear edges of some of the knives, and preferably the alternate blades, lips or extensions 60, which are curved upwardly at their outer edges to support the slices out of contact with those removed by the intermediate knives, and to allow the latter to move freely I curve the outer ends of the extensions upward slightly, as shown in Fig. 7. This arrangement permits me to obtain the effect of employing alternately-arranged wide and narrow blades, and the slightly-curving extensions prevent the slices of a single fruit from adhering after the slicing operation. A guard or rail 61 extends at the inner end of the knives and at its outer ends curves to meet the wall 4, as shown in Fig. 2, to direct the fruit-slices into a suitable receptacle located at the end of the table, as will be understood.

By arranging a feeding mechanism such as I have described at a slight angle to a horizontal plane the pieces of fruit are caused to roll by their own weight, and in many instances they will become righted and rest upon a flattened end without the assistance of the tumbling-rings. The platform, however, being inclined, such pieces as are not righted naturally gravitate toward the outer ring, where their frictional engagement with the latter will tend to impede their movement; but the movement of the platform beneath the pieces will cause the latter to roll rearwardly thereon until they rest in the desired position. The particular form or shape of the tumbling-rings, as well as other parts of the device, may be varied to accomplish the purpose desired without departing from the principle of my invention. The two rings employed form the sides of a channel, preventing an excessive movement of the fruit, as well as operating to retard the fruit and cause it to revolve in a similar manner to the outer ring when contacting therewith.

A slicing-machine constructed in accordance with my invention is adapted to slice fruit very rapidly, and the general arrangement of the parts as I have shown them will cause the separate pieces of cored fruit to assume a stable equilibrium upon the platform, with the core-apertures extending vertically as they are successively forced into contact with the knives by the heads 26, forming ring slices of uniform thickness, and the lips or extensions on the knife-blade will cause the slices to be separated in such a manner that successive slices from the same piece of fruit will not overlap and adhere to each other.

I claim as my invention—

1. In a fruit-slicing machine, the combination with an inclined revoluble support, a plurality of slicing-knives, and means on the support for moving a fruit into contact with the knives, of a guard adapted to be engaged by the fruit and to retard its movement during the movement of the support, and operating devices for revolving the latter.

2. In a fruit-slicing machine, the combination with an inclined movable support, a plurality of slicing-knives, and means for moving a fruit into contact with the knives, of a stationary guard engaging the fruit to cause its independent movement on the support, and devices for operating the support past the knives.

3. In a fruit-slicing machine, the combination with an inclined movable support, a plurality of slicing-knives, and means on the support for moving a fruit into contact with the knives, of a stationary guard arranged at the lower side of the support and adapted to engage the fruit to move it on the support, and devices for operating the latter.

4. In a fruit-slicing machine, the combination with a movable support, a plurality of slicing-knives, and means overhanging the support with which the fruit coöperates to cause it to assume a position of stable equilibrium thereon, of engaging devices on the support for moving the fruit into contact with the knives, and operating devices for moving the support.

5. In a machine for slicing spheroidal fruit having flattened portions the combination with a rotary support inclined to cause the fruit to gravitate toward one side thereof, a series of slicing-knives, and means on the support for moving a fruit into contact with the knives, of a stationary guard arranged in proximity to the support with which the fruit coöperates whereby it is caused to assume a position of stable equilibrium upon one of its flattened portions, and operating devices for revolving the support.

6. In a fruit-slicing machine, the combination with a rotary support inclined to cause the fruit to gravitate toward one side thereof, a series of slicing-knives and one or more heads on the support, of means for moving the heads out of the path of the knives, a guard separate from the support and adapted to coöperate with a fruit carried thereon to cause its movement on the support and means for revolving the support.

7. In a machine adapted to slice spheroidal fruit having flattened portions, the combination with a frame, a rotary support thereon, means for revolving the support, and a plurality of slicing-knives, of one or more heads projecting above the support, means for retracting the heads as they approach the knives, and a guard overhanging the support and retaining the fruit thereon and coöperating with the support to cause a fruit to rest upon one of its flattened portions and means for causing the fruit to engage the guard.

8. In a fruit-slicing machine, the combination with a frame, a rotary support, a series of slicing-knives, and a plurality of vertically-movable heads on the support, of a cam-ring on the frame engaging the head below the support to move the latter out of the path of the knives, a guard extending around one side of the support and having the warped surface extending over the support, and means for revolving the latter.

9. In a slicing-machine, the combination with a frame, a revoluble support thereon provided with apertures, and a series of cutting-knives arranged above the support, of guides on the support, slides operating on the guides having projections thereon, and a cam-ring on the frame supporting the slides, heads adjustably mounted on the slides and operating through the apertures in the support, and means for revolving the latter.

10. In a slicing-machine, the combination with a revoluble support inclined to cause a fruit received thereon to gravitate toward one edge and a series of slicing-knives arranged above the support, of inner and outer stationary walls having warped surfaces and arranged above the support and forming a channel thereon, and means for revolving the support.

11. In a slicing-machine, the combination with an inclined revoluble support, and a series of slicing-knives arranged above the latter at its higher side, of a stationary wall surrounding the lower side of the support, and means for revolving the latter.

12. In a slicing-machine, the combination with an inclined revoluble support, and a series of slicing-knives arranged above the latter at its higher side, of a stationary wall having the warped surface extending over the support at its lower side, one or more projections extending inwardly from said wall, and means for revolving the support.

13. In a slicing-machine, the combination with an inclined revoluble support, a retaining-wall surrounding the latter having the warped surface extending over the support at its lower side and provided with a series of steps at the higher side, of slicing-knives secured to said steps and projecting over said support.

14. The combination with a slicing-machine, having a support for a plurality of knives, of the alternately-arranged wide and narrow knife-blades whereby the successive slices of material removed thereby are prevented from assuming their original relative positions after passing between the knives and means for forcing the material into contact with said knives.

15. The combination with a slicing-machine, provided with a support and steps thereon for a plurality of slicing-knives, of knife-blades mounted on the alternate steps, and similar blades mounted on the intermediate steps having extensions on their rear edges overlapping and curving away from the first-mentioned blades whereby successive slices of material removed by said blades are prevented from adhering to each other after the slicing operation and means for forcing the material into contact with said knives.

16. In a slicing-machine having the knives, the combination with a movable platform, and guides thereon, of a slide having rearwardly-extending perforated lugs engaging the guides, a head on the slide normally projecting above the platform, and means for operating the slide on the guides to retract the head.

17. In a fruit-slicing machine, the combination with a plurality of slicing-knives, a rotary table or support and means for operating it, of a vertically-movable slide mounted thereon, a pusher-head and adjustable connections between it and the slide whereby said head may be adjusted relatively to the knives.

18. In a slicing-machine, the combination with a plurality of slicing-knives, a rotary platform, a base-plate thereon, and separated guide-rods mounted on the plate, of a movable slide having lugs provided with perforations through which said rods extend and means for revolving the platform.

CASSIUS M. HEFFRON.

Witnesses:
G. WILLARD RICH,
WALTER B. PAYNE.